L. B. EDGERTON.
SOLUBLE COMPOSITION OF SODIUM SILICATE OR THE LIKE AND PROCESS OF PREPARING THE SAME.
APPLICATION FILED DEC. 8, 1914.
1,198,203.
Patented Sept. 12, 1916.
2 SHEETS—SHEET 1.
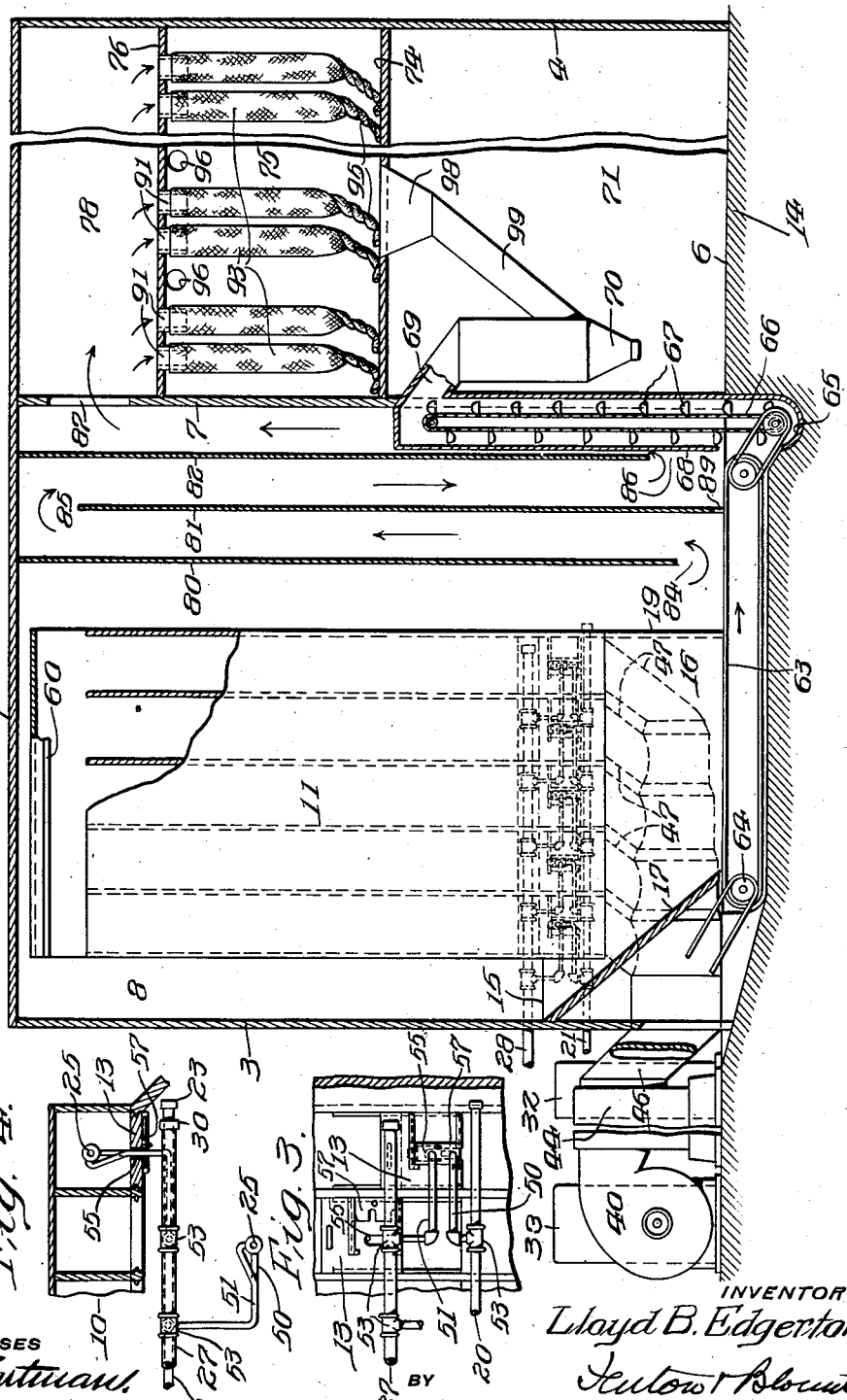
WITNESSES
INVENTOR
Lloyd B. Edgerton
BY
ATTORNEYS

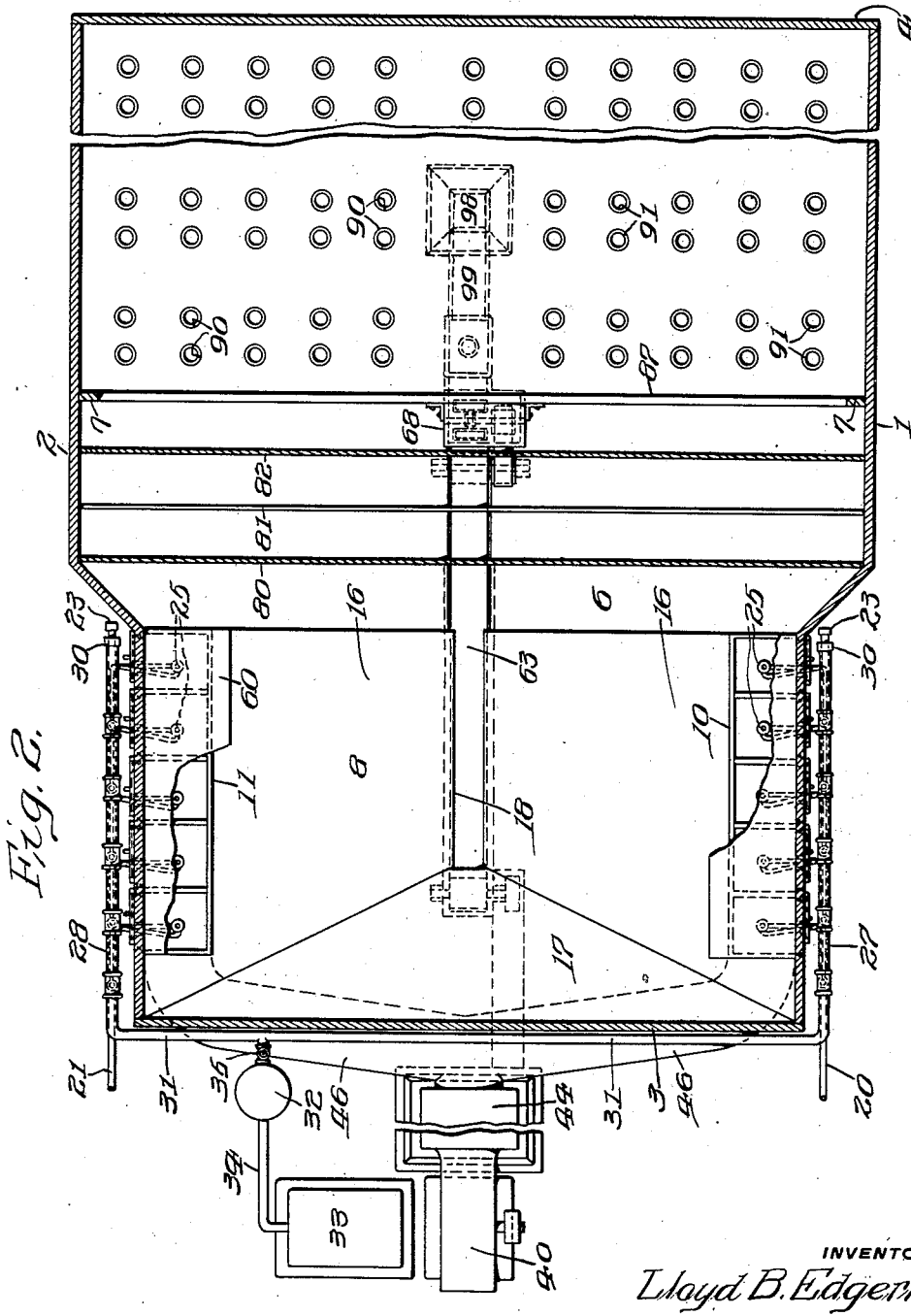

UNITED STATES PATENT OFFICE.

LLOYD B. EDGERTON, OF UPLAND, PENNSYLVANIA.

SOLUBLE COMPOSITION OF SODIUM SILICATE OR THE LIKE AND PROCESS OF PREPARING THE SAME.

1,198,203. Specification of Letters Patent. Patented Sept. 12, 1916.

Application filed December 8, 1914. Serial No. 876,056.

*To all whom it may concern:*

Be it known that I, LLOYD B. EDGERTON, a citizen of the United States, and a resident of Upland, Delaware county, Pennsylvania, have invented certain new and useful Soluble Compositions of Sodium Silicate or the like and Process of Preparing the Same, of which the following is a specification, reference being had to the accompanying drawings.

A principal object of my invention is to provide an alkaline product relatively high in silica and in the form of a fine apparently dry powder which will be readily soluble in hot or cold water and shall be stable under all ordinary conditions, and in which the moisture content may be varied, between limits, to adapt the product for varying uses in the arts.

A further object of my invention is to provide a process by which a desired percentage of the water may be removed from solutions of sodium silicate and the like of the degrees of concentration most frequently employed in the arts, to form the aforesaid product, and which may readily be so regulated and controlled as to leave in the final product substantially any percentage of contained water, within limits, which may be desired, and which may be economically and efficiently performed.

A still further object of my invention is to provide an apparatus suitable for the carrying out of the process and by which the final product may be produced quickly and economically in relatively large quantities.

My invention further includes all of the various other novel steps, characteristics, and features of construction and arrangement hereinafter more definitely specified.

Broadly speaking, my process consists in atomizing or otherwise finely dividing a solution of sodium silicate in the presence of moisture absorbing atmosphere, preferably a moving column of heated air whereby the desired amount of moisture is extracted from the solution and a resultant finely divided alkaline product formed, which is relatively high in silica, stable under all ordinary conditions and readily soluble in hot or cold water, its degree of solubility in cold water, however, being somewhat affected by the percentage of contained moisture. The resultant product may thereafter be collected by any suitable means.

For the purpose of carrying out my process any apparatus may be employed suitable to obtain the results desired, but in the practice of my invention, I prefer to make use of an apparatus constructed substantially as shown in the drawings, in which—

Figure 1 is a vertical longitudinal section through the apparatus, certain parts being shown in elevation for the sake of clearness; Fig. 2 a horizontal section thereof; Fig. 3 an enlarged fragmentary side elevation of a detail of the device; and Fig. 4 an enlarged plan view of a similar detail partially in horizontal section.

The form of apparatus illustrated and which is suitable for the carrying out of the process on a relatively large commercial scale, may comprise a suitable building having side walls, 1 and 2, front wall 3, rear wall 4, roof 5, and main floor 6, the interior of the building being divided transversely by a vertically extending partition 7, the space in front of the partition, that is, between it and the front wall 3, constituting a room hereinafter referred to as the "stack room" or chamber 8. The side walls 1 and 2 of the building may extend rearwardly from the front wall 3 in a single plane or may be outwardly diverged near the rear of the stack room as shown in the drawings so that the back part of the building will be somewhat wider than the front portion. That portion of the building in the rear of partition 7 is divided by means of suitable horizontal floors into a plurality of different rooms which will hereinafter be described in detail.

Referring now more especially to the construction and arrangement of those parts of the apparatus in the front of the partition 7 and through the operation of which the atomizing of the silicate solution and the reduction of its moisture content is carried out, the same may comprise a plurality of vertically extending stacks 10 and 11 open at the top and arranged along the sides of the stack room 8, constructed of any suitable material, and of any suitable dimensions. In practice, however, it is preferred to make the stacks substantially rectangular or circular in cross section and of a width or diameter relatively small in proportion to their length as shown in the drawings. If the stacks are constructed of substantially rectangular section, the side walls 1 and 2 of the building may be utilized to form the back wall of the stacks as shown, and in such case, the side walls adjacent the base of each stack may be provided with suitable preferably separate vertically sliding doors 13, whereby access may be obtained to the interior of each stack when desired. It will be understood that in practice any number of stacks may be employed though good results may be obtained by the use of five stacks upon each side as illustrated. The lower ends of the stacks may preferably terminate at a point considerably above the foundation 14 of the building. Within the stack room between the opposed sets of stacks are located the false floors 16 sloping downwardly toward the center of the building. The angle of the floors is such that their surface intersects the fronts of the stacks near the lower ends of the latter, and the floors are carried up to a line 15 upon the side walls 1 and 2 between the stacks and front wall 3. Another false floor 17 slopes downwardly from a corresponding line on this wall and intersects with the floors 16. A longitudinal opening 18 is left, however, between the adjacent inner edges of the false floors 16 which opening extends from the points of intersection of the lower edges of these floors and the lower edge of the floor 17 which slopes from the front wall 3, toward the rear of the building to a point adjacent partition 7 for a purpose to be hereinafter described. A suitable partition 19 adjacent that edge of the floors 16 nearest partition 7 serves to close the open space formed between the under sides of the floors 16, the sides of the building and the surface of the main floors 6.

In the operation of the apparatus, the silicate solution is forced under suitable pressure and by means of a suitable pump, not shown, into the silicate pipes 20 and 21 which extend preferably along the outside of the building parallel to the side walls thereof, the ends of the pipes opposite to those at which the solution is introduced being permanently closed by suitable caps 23. The silicate pipes are connected, preferably, as hereinafter described, to suitable atomizing nozzles 25 one of which is located centrally of each stack adjacent the lower end thereof and pointing vertically upward therein, each nozzle being also similarly connected to the air pressure pipes 27, 28, preferably extending parallel to and above the silicate pipes and in the same vertical plane therewith, one end of each of the air pipes being suitably closed by a cap 30 and the other end connected by means of suitable piping 31 to an air receiver 32 in which atmospheric air may be maintained at suitable pressure by means of the air pump 33 of any suitable or preferred construction connected to the receiver by piping 34. A valve 35 between the receiver and pipe 31 controls the admission of air thereto and from thence to the air pipes. The nozzles 25 may be of any suitable or preferred construction capable of effectuating the atomization of the viscous silicate solution and of ejecting the same upwardly in the form of an inverted cone having very gradually diverging sides, whereby contact of the ascending particles of the atomized solution with the walls of the stack is prevented and the cone-like contour of the ascending vapor preserved for substantially the entire length of the stack.

For the purpose of supplying a suitable ascending column of heated air in each stack to absorb requisite amount of moisture from the finely divided silicate solution as it issues from the atomizing nozzles 25, as hereinafter described, I prefer to provide a blower 40 of any suitable or preferred construction which may be located exteriorly of the building preferably near the front wall thereof as indicated, and driven from any suitable source of power. The blower is arranged to force atmospheric air at a suitable pressure into the heating chamber 44 which also may be of any suitable or preferred form, as for instance, a suitable box-like casing, housing a plurality of steam coils to which steam is supplied from any suitable source, and as the arrangement and details of this device may be of any construction proper to effect the drying of the air discharged by the blower and the raising of the temperature thereof to any desired point, the same are not illustrated in the drawings. From the heater 44, the air is carried by means of a suitable pipe 46 toward the front wall 3, the pipe being branched laterally adjacent thereto and carried through the wall and beneath the stacks, the outer ends of each branch of the pipe being closed to form a header along each side of and within the building, the headers preferably resting in the spaces formed beneath the false floors 16, the bottoms of the stacks and the side walls 1 and 2 respectively. The headers are connected by a plurality of separate upwardly extending pipes 47 with the bottoms of the stacks and the proportions of each header and of the pipes are so designed that a substantially equal quantity of air will be discharged into each separate stack when the blower 40 is in operation, the heating chamber being so arranged that the temperature of the air may be regulated and maintained at any desired point.

While any suitable or preferred method may be employed for supporting the nozzles 25 within the stacks and connecting them with the air and silicate pipes, I prefer to so arrange the nozzles that they may be readily separately withdrawn from the stacks for the purpose of cleaning and adjustment, and for this purpose, I run a substantially L-shaped pipe 50 from the adjacent silicate pipe to the bottom of any given nozzle, and a similar L-shaped pipe 51 from the adjacent air pipe to the side of the same nozzle. The ends of these pipes opposite the ends connected to the nozzles are turned respectively vertically downwardly and vertically upwardly, and connected to the silicate and air pipes by vertically aligned swinging joints 53 which may be of any suitable construction to permit the rotation of the pipes in a horizontal plane. Substantially in the middle of the doors 13, I provide a vertically extending slot 55 of sufficient width to permit the door to slide downwardly into closed position over the pipes 50 and 51 when the nozzle is in operative position within the stack, and I so locate the swinging joints 53 longitudinally of the air and silicate pipes that when any door 13 is raised, the nozzle may be swung outwardly to the position shown in Fig. 4 for cleaning or other purposes, the vertical distance between the air and silicate pipes being sufficient to permit the nozzle to pass between them and the axis of rotation being sufficiently offset to allow the nozzle to clear the side of the stack during its outward movement. After the nozzle has been adjusted, it may be readily swung back to its position within the stack and the door 13 slid vertically downwardly to closed position. To render the stack substantially air tight, a suitable laterally sliding plate 57 may be provided upon the exterior of the door to completely close the slot 55, it being desirable to render the stacks, and in fact the whole stack room chamber, as air tight as possible. Over the upper open ends of the stacks an inwardly curving deflector 60 is provided whereby the air currents issuing from the stacks will be projected toward the center of the stack room.

During the operation of the apparatus which will hereinafter be described in detail, the atomized silicate solution is projected simultaneously upward from each of the nozzles 25 into the ascending column of heated air discharged into the stacks from the pipes 47, which serves to extract almost instantaneously the required amount of moisture so that on issuing from the top of the stacks the ascending air will contain the dust-like final product suspended therein, a portion of which, comprising the heavier part, will immediately settle to the floor of the stack room and will slide downwardly thereon toward the longitudinal space 18 between the inwardly slanting false floors 16, where it will lodge upon a suitable belt conveyer or other carrying means 63, preferably located below the level of the main floor 6, constantly traveling in the direction of the arrow and actuated from any suitable source of power as by belt 64 and will be carried over and disposed within a suitable chamber 65 from which it may be elevated by suitable elevating means 66, provided with buckets 67 and inclosed in a vertically extending casing 68 and conveyed to the chute 69 passing through partition 7 and thence to a hopper 70 within the packing room 71 in the back part of the building and occupying the whole lower portion thereof. Above this room and separated from it by a suitable horizontal floor 74, is the air outlet room 75 above which in turn and separated therefrom by a horizontal floor 76, is the dust room 78, both of these rooms being coextensive with the interior of that portion of the building in which they are located. However, but a relatively small portion of the final product will in practice settle upon the floor of the stack room and it is, therefore, necessary to provide means whereby the impalpably fine material still suspended within the air discharged from the stacks may be collected, and for this purpose I prefer to provide means whereby the velocity of the moving air will be constantly diminished to a point at which means may be successfully interposed in its path to extract the suspended matter, and for this I provide a series of vertical extending curtain walls 80, 81, 82 extending transversely across the building and provided with suitable openings of increasingly greater area so disposed as to cause the current of air to alternately ascend and descend while traversing said openings whereby its velocity will be greatly diminished. While I may arrange the openings in the walls in any desired manner, I prefer to form them by leaving suitable spaces between the upper or lower edges of the curtain walls and the roof or floor of the building as the case may be. In this manner I provide an opening 84 adjacent the lower edge of wall 80, an opening 85 of greater vertical height than the opening 84 adjacent the top of the wall 81, an opening 86 adjacent the bottom of the wall 82 and of greater height than the opening 85, and an opening 87 of still greater height in partition 7 which separates the dust room 78, air outlet room 75 and packing room 71 from the front part of the building, all of the several openings preferably extending horizontally from one side of the building to the other. A small opening 89 will also necessarily be provided in the lower part of the curtain wall 81 to permit the passage of any material resting upon the conveyer 63, the opening, however, being made as small as possible to prevent the escape of a material quantity of air at that point. It will thus be evident that the several separate columns of air discharged from the various stacks will first be deflected toward the middle of the stack room by the deflectors 60 and there, merging together, will be forced downwardly toward the floor by the continuous discharge from the stacks and thence, carrying the suspended material, through the opening 84, upwardly between walls 80 and 81, through opening 85, downwardly between walls 81 and 82, through opening 86, upwardly between walls 82 and partition 7 and through opening 87 as indicated by the arrows, finally reaching the dust room 78 with a diminished velocity of preferably not over one-half foot per second.

The floor of the dust room is provided with a plurality of openings 90 the sum of the areas of the several openings 90 being preferably greater than the area of the opening 87, in each of which is secured a downwardly depending pipe or nipple 91 extending for a short distance below the floor into the air outlet room 75. To each of these nipples is secured a tubular bag 93 preferably composed of fine soft cloth having an extremely small mesh, and formed of a length somewhat greater than the vertical distance between the floors 74 and 76 so that the lower end of each of the bags may be folded over as indicated at 95 for the purpose of closing the bag during the dust collecting operation, the folded ends resting upon the floor 74. The now slowly moving air carrying the suspended material passes from the room 78 through the openings in the floor 76 and into the bags 93 with still further reduced velocity owing to the large combined area of the openings, and traversing the walls of the bags, into the air outlet room 75, from which it passes in turn to the outer atmosphere through air ports 96 in the walls of the building. The suspended material, however, is unable to pass through the fine meshes of the material from which the bags are formed, especially in view of the greatly diminished velocity of the air in which it is suspended, and is therefore retained within the bags, from which it may be readily collected as desired by unfolding the ends 95 and emptied in the hopper 98 in the floor of the room which is connected by a suitable chute 99 with the hopper 70 and preferably closed, except when in use, by a suitable trap door (not shown). The material coming from the chute 99 mingles with that from the chute 69 and is ejected from the lower end of the hopper 70 into the packing room 71 at which point it may be prepared for shipment.

With an apparatus constructed substantially as hereinbefore described, the operation of my process may be effectuated by supplying the silicate solution to the pipes 20 and 21 at suitable pressures and by means of a pump or other device (not shown), and in practice, I find that good results may be obtained with a pressure of 15 to 20 pounds to the square inch. Simultaneously compressed air at relatively high pressures is supplied to the pipes 27 and 28 from the receiver 32 and from thence to the nozzles for the purpose of forcing the silicate solution therefrom in atomized condition as hereinbefore explained. In practice, I have found for the purpose of atomizing the viscous solution, an air pressure of from 2½ to 8 atmospheres may be employed, the higher pressures with suitable nozzles giving the most satisfactory results. The temperature of the air supplied to the nozzles may be varied between considerable limits, good results being obtained when the air is of substantially the temperature as it comes from the receiver 32. During the atomization of the solution and as it is ejected from the nozzles, a suitable moving column of air is supplied to each of the stacks from the heater 44 through the medium of the pipe connection hereinbefore described, the temperature of which may be varied within considerable limits. In practice, however, I find that the best results are obtained when the temperature of the column of air is maintained between 140° and 200° F., depending upon the percentage of moisture which it is desired to leave in the final product, the air when maintained at the higher temperatures extracting a greater percentage thereof. I have also found that to produce the final product with a given moisture content, the temperature of the column of air will necessarily be varied to a certain extent depending upon the amount of moisture contained in the atmospheric air drawn into the blower 40, a greater percentage of moisture in the atmospheric air necessitating the maintenance of the air discharged into the stacks at a higher temperature in order to produce a given moisture content than when the atmospheric air contains a smaller percentage of moisture, in which case lower temperatures may be utilized and the same final results attained. By a proper regulation of the temperature of the moving column of air, almost any amount of moisture may be extracted so that the final product may be made to contain as little as 2% of water or even less. However, it is generally desirable for commercial purposes to form the product with a moisture content of approximately 20% in which condition it is more readily soluble in cold water than when containing a smaller percentage of moisture, while remaining stable under all ordinary conditions. Furthermore, it will be evident that the operation of the apparatus may be carried on for such periods of time as may be desired without stopping, the product being collected from time to time from the bags in the air outlet room 75 and transferred to the packing room, each of said rooms being of course provided with suitable doors for the ingress and egress of the workmen which, however, are not shown in the drawings for the sake of clearness.

I do not desire to limit myself to the production of soluble compositions high in silicate from solutions of sodium silicate alone, as solutions of other silicates may equally well be employed, either alone, or in combination with other ingredients such as sodium sulfate, which may if desired be combined with a solution of sodium silicate and a resultant soluble product formed therefrom by means of my process which is equally adapted for use with such combined solutions as with a pure solution of sodium silicate, nor do I desire to limit myself in the carrying out of my process to the use of an apparatus constructed in exact conformity to the apparatus herein described, as it will be evident that various changes may be made in the details thereof without departing from its principal features and characteristics and from the spirit and scope of my invention as defined in the appended claims.

Having thus described my invention, I claim and desire to protect by Letters Patent of the United States:

1. The process of preparing a soluble composition of sodium silicate, which consists in discharging a finely divided solution of sodium silicate into a moving column of heated air.

2. The process of preparing a soluble composition of sodium silicate, which consists in atomizing a solution of sodium silicate in the presence of a moving column of heated air of relatively large volume.

3. The process of preparing a soluble composition of sodium silicate, which consists in atomizing a solution of sodium silicate and ejecting the same upwardly in the presence of an upwardly moving column of heated air.

4. The process of absorbing a portion of the moisture content from a solution of sodium silicate, which consists in discharging the solution in finely divided condition into a moving column of heated air having a relatively low moisture content.

5. The process of extracting a portion of the moisture content from a solution of sodium silicate, which consists in discharging the solution is finely divided condition into a moving column of air having a temperature between 140° and 200° Fahrenheit and a relatively low moisture content.

6. The process of preparing a soluble composition of sodium silicate, which consists in atomizing a solution of sodium silicate in the presence of a moving column of heated air whereby a desired percentage of the moisture content of said solution is extracted, and said composition produced in the form of a finely divided, apparently dry powder.

7. The process of preparing a soluble solid composition from a solution of sodium silicate, which consists in discharging the solution in finely divided condition into a moving column of heated air, whereby a portion of the moisture content of the solution is absorbed and a final product soluble in cold or warm water obtained in the form of a finely divided apparently dry powder having a moisture content of less than twenty per cent.

8. An alkaline sodium silicate composition having the appearance of a fine, apparently dry powder comprising substantially globular particles, said composition being readily soluble in hot or cold water and stable under ordinary conditions.

9. A sodium silicate composition having an alkaline reaction, and in the form of an apparently dry fine powder composed of substantially spherical particles, said composition being freely soluble in hot or cold water, and having a relatively small percentage of contained moisture.

10. An alkaline product, relatively high in silica, and in the form of a fine globular, apparently dry powder, which product is readily soluble in hot or cold water, and stable under all ordinary conditions.

11. The process of preparing a soluble composition of sodium silicate which consists in discharging a finely divided solution of sodium silicate into a moisture-absorbing atmosphere.

12. The process of preparing a soluble composition of sodium silicate which consists in discharging a finely divided solution of sodium silicate into a body of moisture-absorbing air.

In witness whereof, I have hereunto set my hand this 7th day of December, 1914.

LLOYD B. EDGERTON.

Witnesses:
JAMES G. VAIL,
GEORGE K. HELBERT.